Feb. 4, 1964  G. A. WOOD, JR  3,120,357
SPINNING REEL BRAKE
Filed Oct. 6, 1959  3 Sheets-Sheet 1
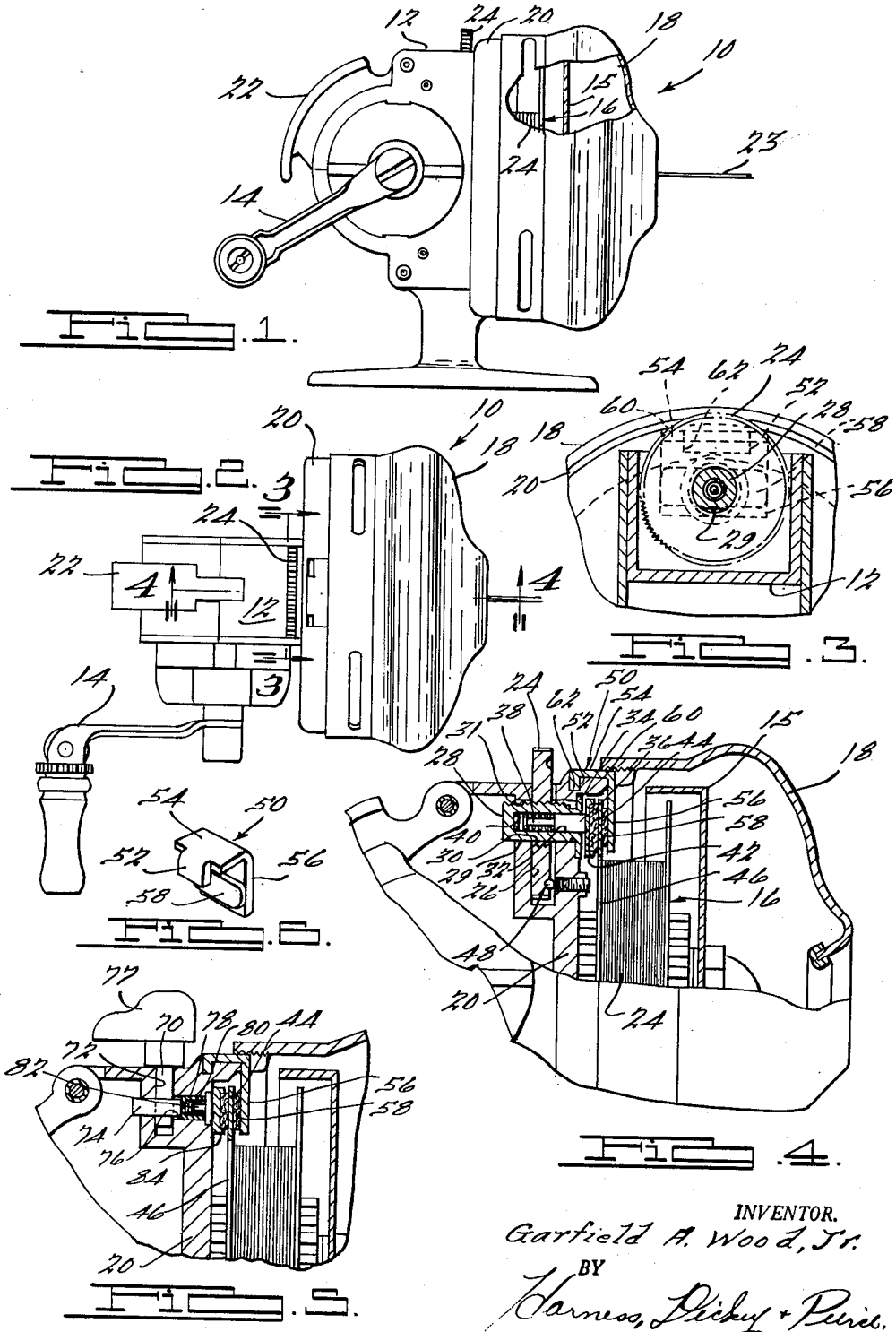
INVENTOR.
Garfield A. Wood, Jr.
BY
Harness, Dickey + Pierce.
ATTORNEYS.

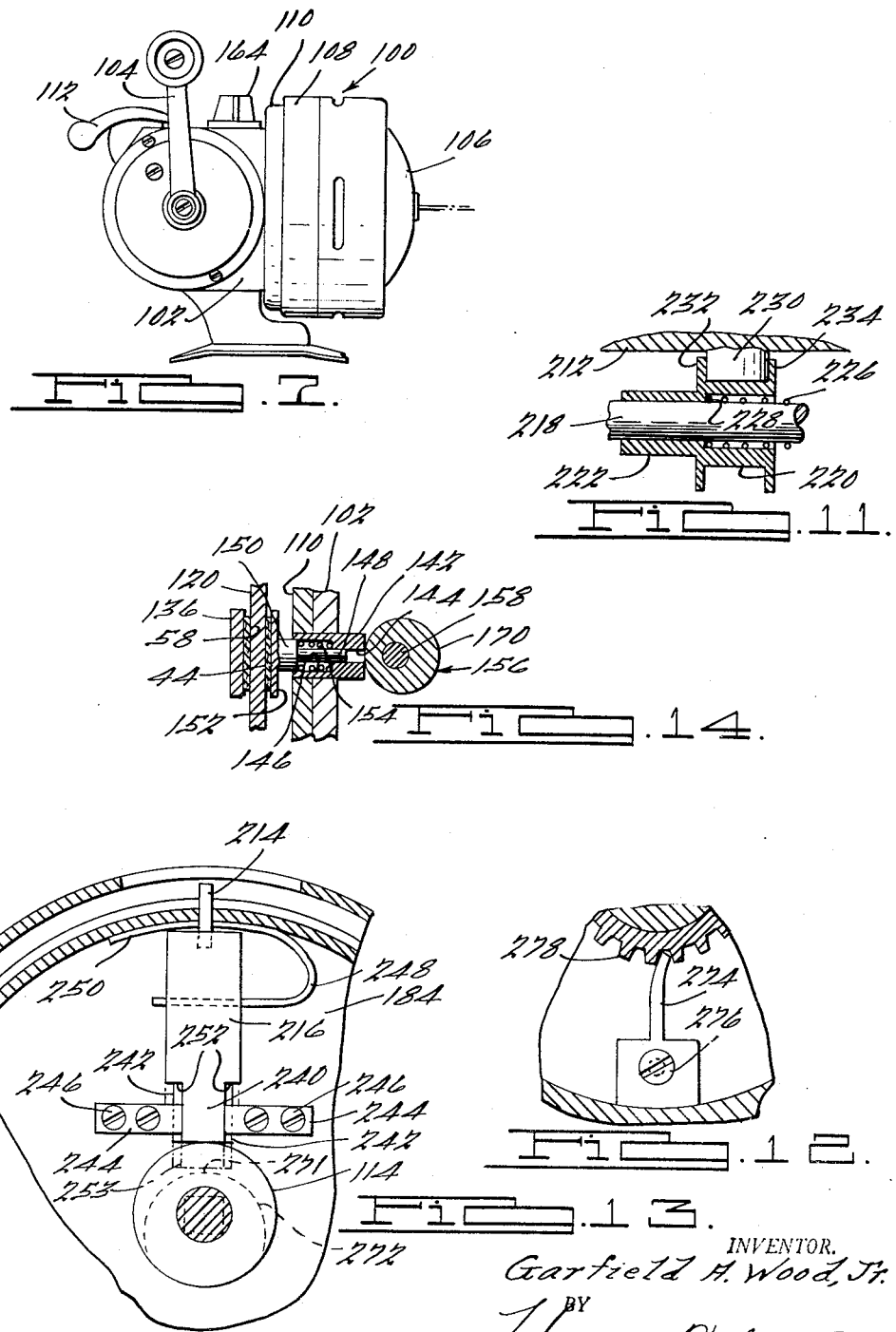

Feb. 4, 1964  G. A. WOOD, JR  3,120,357
SPINNING REEL BRAKE
Filed Oct. 6, 1959  3 Sheets-Sheet 3
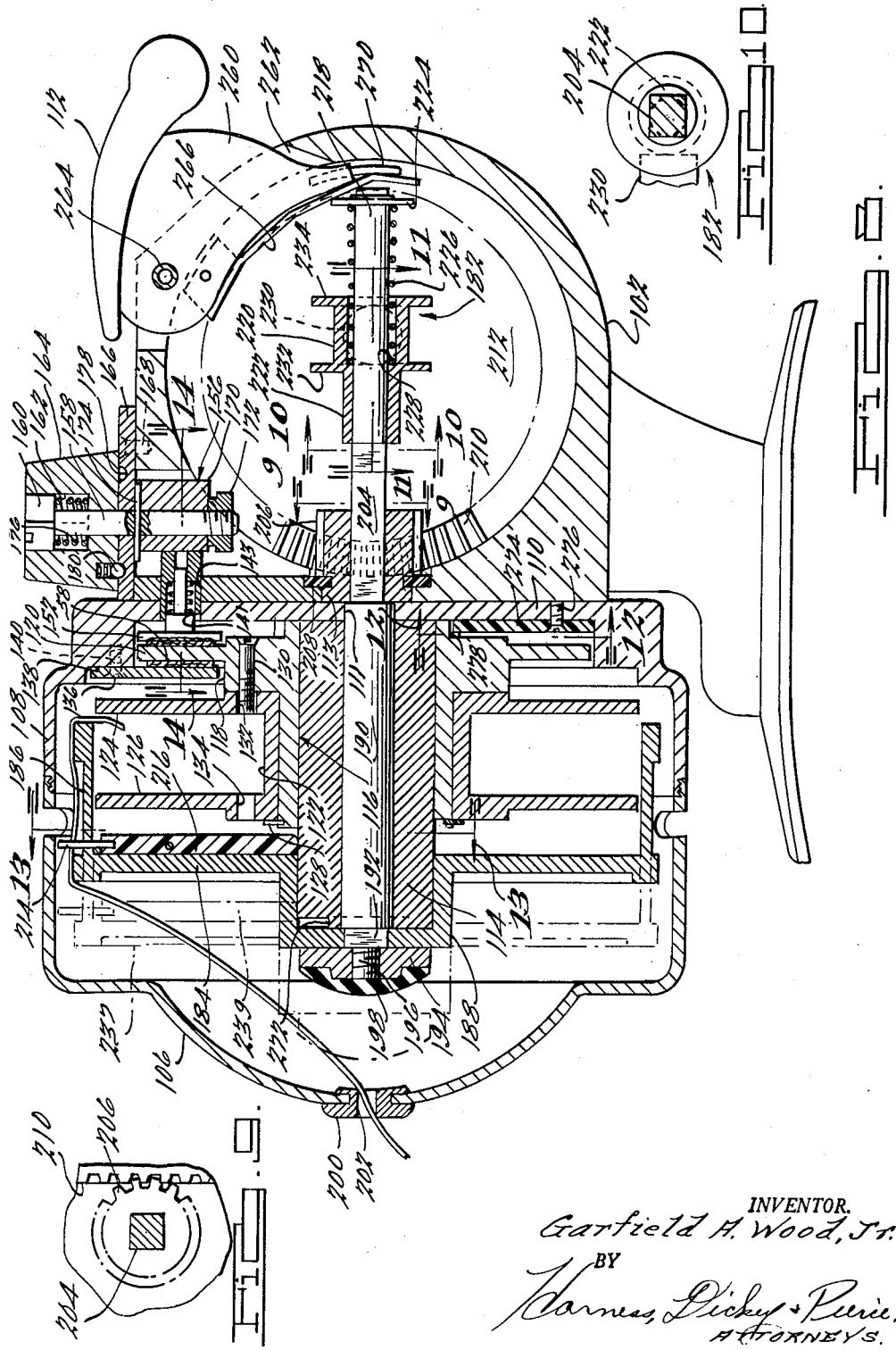
INVENTOR.
Garfield A. Wood, Jr.
BY
Harness, Dickey & Pierce.
ATTORNEYS.

United States Patent Office 3,120,357
Patented Feb. 4, 1964

3,120,357
SPINNING REEL BRAKE
Garfield A. Wood, Jr., 4565 Sable Palm Road,
Miami, Fla.
Filed Oct. 6, 1959, Ser. No. 844,745
1 Claim. (Cl. 242—84.5)

This invention relates to friction brakes for fishing reels and particularly to an improved friction brake for a closed face spinning reel.

Closed face spinning reels are currently the most popular reel being used by the average fisherman and account for the largest percentage of fishing reels sold. These reels are relatively inexpensive and differ from open face spinning reels in that they are enclosed by a cup-shaped cover. Generally, closed face spinning reels are provided with an adjustable brake that frictionally engages the spool in a manner to resist rotation thereof unless a force in excess of a predetermined amount is exerted thereon. However, most of these brakes are inefficient and uneven in operation to the extent that when fighting a running fish the fishing line is subjected to a series of jerks as it is payed out against the braking action. Manifestly, such an uneven jerky braking action is extremely undesirable and it may break the fishing line.

It is one object of the present invention to provide a brake for closed face spinning reels that eliminates the aforementioned uneven and jerky operation of prior art brakes.

It is another object of the invention to provide a brake that engages both sides of one of the flanges of the spool of the reel to provide an even, smooth braking action that does not tend to bind or cock the spool relative to the axis about which it rotates.

It is a further object of the invention to provide an exceptionally simple and economical brake having a smooth even and positive braking action that can be easily incorporated in existing closed face spinning reels with an absolute minimum of modification thereof.

It is a still further object of the invention to provide a brake that engages both sides of a flange pinned to the spool of the fishing reel for rotation therewith to provide an even, smooth braking action that does not tend to bind or cock the spool relative to the axis about which it rotates, and which enables the spool to be reversed without removing the brake to change the direction in which the fishing line is wound thereon.

It is a still further object of the invention to provide a brake for a closed face spinning reel that is extremely simple and inexpensive, yet rugged, effective and smooth in operation.

Other objects and features of novelty of the invention will be specifically pointed out or otherwise become apparent when referring, for a better understanding of the invention, to the following description taken in conjunction with the accompanying drawing, wherein:

FIGURE 1 is a side view of a closed face spinning reel embodying features of the present invention;

FIG. 2 is a plan view of the spinning reel of FIG. 1;

FIG. 3 is an enlarged sectional view taken along the line 3—3 of FIG. 2;

FIG. 4 is an enlarged sectional view taken along the line 4—4 of FIG. 2;

FIG. 5 is a fragmentary sectional view of the structure illustrated in FIG. 4 illustrating a modification of the invention;

FIG. 6 is a separate perspective view of one element of the brake of the present invention;

FIG. 7 is a side view of another closed face spinning reel embodying features of the present invention;

FIG. 8 is an enlarged sectional view of the spinning reel illustrated in FIG. 7;

FIG. 9 is a sectional view taken along the line 9—9 of FIG. 8;

FIG. 10 is a sectional view taken along the line 10—10 of FIG. 8;

FIG. 11 is a sectional view taken along the line 11—11 of FIG. 8;

FIG. 12 is a sectional view taken along the line 12—12 of FIG. 8;

FIG. 13 is a sectional view taken along the line 13—13 of FIG. 8, and

FIG. 14 is a sectional view taken along the line 14—14 of FIG. 8.

Referring to FIGS. 1 and 2, a conventional closed face spinning reel 10 is illustrated having a body 12, a handle 14 for rotating a spooling member 15 to wind a fishing line 23 on a spool 16 rotatably mounted on the body 12 and a cup-shaped cover 18 enclosing the bail and spool and secured to the periphery of a circular portion 20 of the body 12. The reel 10 also has a push button 22 that can be actuated to clamp the fishing line 23 to the cup-shaped cover 18 to prevent the fishing line from paying out.

Referring also to FIGS. 2 and 3, the reel 10 has a brake mechanism for frictionally resisting rotation of the spool relative to the body 12 comprising a small knurled wheel 24 disposed within a slot 26 in the body 12 and projecting slightly above the body as illustrated most clearly in FIGS. 1 and 2. An externally threaded stub shaft 28 having a flat side 29 threadably engages an internally threaded aperture 30 in the wheel 24 so that rotation of the wheel in one direction or the other advances and/or retracts the stub shaft 28, the flat side slidably engaging the flat side of a D-shaped aperture 31 in the body 12 to prevent rotation of the stub shaft 28. A spring mounted ball detent 48 is also provided to yieldably retain the wheel 24 in a given angular position.

The stub shaft 28 has an axially extending bore 32 therein opening on the right end thereof, and a radially extending flange 34 also on the right end thereof engaging the right face of the circular portion 20 to prevent movement of the stub shaft 28 to the left as viewed in FIG. 4. A plunger 36 having a reduced end portion 38 is slidably disposed within the bore 32, and a spring 40 extends over the reduced end portion 38 to resiliently urge the plunger 36 outwardly of the bore. The right end of the plunger 36 has an enlarged portion 42 thereon and a brake pad 44 of suitable friction material is secured thereto for bearing against a flange 46 of the spool 16.

With this construction, it is apparent that rotation of the wheel 24 will vary the force with which the spring 40 urges the brake pad 44 against the flange 46 to control the braking pressure applied to the spool. However, it is apparent that this type of brake exerts an off-center force on the spool 16 so that the spool is cocked in a manner to cause an uneven and jerky braking action that may snap the fishing line 24 when fighting a fish.

The present invention completely eliminates this uneven jerky braking action in a very simple and clever way that requires a minimum amount of alteration of the reel 10 described. This is accomplished by attaching a bracket 50 (FIG. 6) having an L-shaped cross section with a short leg 52, a web 54 and a long leg 56 to the periphery of the circular portion 20 of the body 12 as disclosed in FIG. 4 with the long leg 56 overlapping the other side of the flange 46 opposite the side engaged by the brake pad 44. A brake pad 58 is secured to the long leg 56 in position to engage the flange 46 and resist the tendency of the force exerted on the brake pad 44 by the spring mounted plunger 36 to cock and bind the spool 16 as previously described.

The bracket 50 may be very simply and effectively retained in position by fixing the web 54 in a transverse slot 60 in the periphery of the circular portion 20 with the short leg 52 projecting into a suitable recess 62 in the periphery of the circular portion. In this manner the outer surface of the web 54 is flush with the periphery of the circular portion 20 and will not interfere with the securing of the cup-shaped cover 18 thereto. When the cup-shaped cover is secured and positioned as illustrated in FIGS. 3 and 4, it will firmly lock the clamp member 50 in the position illustrated and prevent its escape from the slot 60 and recess 62.

From the foregoing it is apparent that by merely providing a simple L-shaped bracket 50 having the brake pad 58 thereon, the conventional reel 10 can be inexpensively and simply modified to eliminate the objectionable uneven and jerky braking action previously described. Tests conducted on actual reels modified to incorporate the brake of the present invention have proved that a very smooth and even braking action is obtained.

In its broader aspects it is apparent that the brake of the present invention provides the even braking action by frictionally gripping a flange of the spool 16 on opposite sides thereof to prevent the cocking of the spool, and therefore it is to be specifically understood that the present invention is not limited to the particular mechanism used for urging the brake pad 44 against the flange 46. In this regard, by way of example only, another mechanism is shown in FIG. 5 for urging the brake pad 44 into engagement with the flange 46. It is comprised of a shaft 70 disposed within a bore 72 in the body 12 and having an eccentric cam 74 secured to the lower end thereof in position to rotate within a horizontal slot 76 in the body 12, a handle 77 being provided for rotating the shaft 70.

A suitable cup-shaped element 78 may be slidably retained in an aperture communicating the slot 76 with the right face of the circular portion 20 so that the left end of the element 78 bears against the cam 74. A spring 80 may then be disposed within element 78 and centered on a pin 82 fixed to an enlarged portion 84 to which the brake pad 44 is secured. With this construction rotation of the handle 76 rotates the cam 74 to cam the element 78 to the right. This increases the compression of the spring 80 which in turn increases the pressure with which the brake pad 44 engages the flange 46. Suitable means (not shown) may be provided for yieldably retaining the handle 76 in the desired angular position.

Referring to FIG. 7 a closed face spinning reel 100 embodying other features of the present invention is illustrated having a body 102, a handle 104 and a cup-shaped cover 106 screwed onto the right end of a cylindrical wall portion 108 projecting from a flat circular portion 110 secured to the body 102. The reel 100 also has a push-button 112 that can be actuated to clamp the fishing line to the cup-shaped cover 106 in a manner similar to that previously described.

As most clearly illustrated in FIG. 8 the spinning reel 100 has a bushing 114 fixed to and projecting from the flat circular portion 110 which is coaxially aligned with a central aperture 111 in the circular portion 110 and an aperture 113 in the body 102. Another bushing 116 is rotatably mounted on the bushing 114 and has a radially projecting flange 118 near the right end thereof with a relatively thin flange 120 projecting radially from the flange 118. The bushing 116 and its flanges 118 and 120 have been illustrated herein as a one-piece unit, however, it will be appreciated that it could also be made of several separate pieces suitably secured together.

A spool 122 having parallel spaced flanges 124 and 126 is rotatably mounted on the bushing 116 and held in abutting engagement with the flange 118 by a suitable snap ring 128 or the like secured within a groove in the end of the bushing 116. The spool 122 is pinned for rotation with the bushing 116 by a screw 130, or the like, projecting from the flange 118 and into a suitable aperture 132 in the flange 124. A similar aperture 134 is also provided in the flange 126 to enable the spool to be reversed to change the direction in which the fishing line 23 is wound thereon without necessitating that the fishing line be completely unwound and rewound in the opposite direction.

A brake and brake mechanism is also provided which is similar to that already described and as most clearly illustrated in FIGS. 8 and 14, comprises a bracket 136 suitably secured to a shoulder 138 on the circular portion 110 by a plurality of screws 140 or the like. The bracket 136 extends downwardly and overlaps the left face of the flange 120 and the brake pad 58 is secured thereto to frictionally engage the left face of the flange 120. A bushing 142 is slidably mounted in apertures 141 and 143 in the circular portion 110 and the body 102, respectively, and has a central aperture 144 extending therethrough with an enlarged portion 146 adjacent the left end thereof. A plunger 148 is slidably disposed in the central aperture 144 of the bushing 142 and has an enlarged portion 150 on the left end thereof slidably disposed within the enlarged portion 146 of the central aperture 144. The enlarged portion 150 carries a flat head 152 to which the brake pad 44 is secured in position to frictionally engage the right face of the flange 120. A suitable spring 154 is disposed within the enlarged portion 146 of the bushing 142 to resiliently urge the brake pad 44 into frictional engagement with the flange 120, and the flange 120 into frictional engagement with the brake pad 58.

A suitable cam mechanism 156 is provided for shifting the bushing 142 axially to vary the compression of the spring 154 to vary the frictional engagement of the brake pad 44 and brake pad 58 on the flange 120. The cam mechanism 156 comprises a bolt 158 having a flat sided head 160 on the upper end thereof slidably keyed within a suitable recess 162 in a knob 164. The bolt 158 slidably extends through a plate 166 which is secured to the body 102 by suitable screws 168 or the like. A bushing 170 is eccentrically mounted on the bolt 158 and secured thereon by a nut 172 screwed on the threaded end of the bolt 158. The bushing 170 is keyed to the bolt 158 by a pin 174 passing therethrough and through the shank of the bolt.

A suitable spring 176 is disposed about the bolt 158 and within the recess 162 to resiliently urge the bolt, and the parts carried thereby, upwardly into engagement with the plate 166, and to resiliently urge the knob 164 downwardly into sliding engagement with the plate 166. The plate 166 has a plurality of detents 178 formed thereon and the knob 164 has a plurality of spring mounted balls 180 which engage the detents 178 to position the knob 164 in a plurality of rotative positions relative to the plate 166, each of which positions is indicated by suitable indicia on the plate 166. With this construction, the knob 164 can be rotated to rotate the eccentric bushing 170 to shift the bushing 142 which in turn varies the compression of the spring 154 to vary the frictional engagement of the brake pads 44 and 58 with the flange 120 as previously mentioned.

However, by virtue of the fact that the brake pads engage the flange 120, rather than directly engaging one of the flanges of the spool 122 as in the embodiments of FIGS. 1–5, the spool is free to be removed without disassembling the brake mechanism, and reversed as previously described with the aperture 134 slipped over the screw 130 to reverse the direction in which the fishing line is wound. This eliminates the tedious task of unwinding and rewinding the fishing line on the spool. Further, with the brake mounted out of the way in this manner a level winding mechanism 182 can be provided for rotating and reciprocating a cup-shaped winding element 184 relative to the spool 122 to evenly distribute the fishing line 23 as it is wound thereon.

The cup-shaped winding element 184 has a cylindrical wall portion 186 which extends over the flange 126 of the spool 122 and a central hub portion 188 which is rotatably mounted on the left end of the bushing 114. The hub portion 188 is keyed to a squared portion 192 on a shaft 190 slidably extending through the bushing 114 and aperture 111 in the circular portion of the wall 110. The hub portion is retained on the squared portion 192 by a nut 194 screwed on a threaded end portion 196 of the shaft 190. The nut 194 has a rubber piece 198 secured thereon in position to abut against the right end of an apertured bead 200 reinforcing a central aperture 202 in the cup-shaped cover 106, the purpose of this, of course, being to clamp the portion of the fishing line passing through the bead 200 by means of the rubber piece 198. The manner in which the rubber piece is advanced will be described in greater detail hereinafter.

The shaft 190 is also provided with a squared portion 204 which slidably extends through a gear 206. The gear 206 is slidably keyed for rotation with the shaft 190 by means of the squared portion 204 and is rotatably journaled in the aperture 113 of the body 102 by a washer 208 which is preferably made of Teflon or nylon, or the like. The gear 206 is drivingly engaged by a plurality of teeth 210 on a gear 212 rotatably journaled on the body 102 and adapted to be rotated by the handle 104 so that rotation of the handle 104 rotates the cup-shaped winding element 184 relative to the spool 122. The spool, of course, is frictionally held against rotating by the brake pads 44 and 58 since it is pinned to the bushing 116 as previously described. A suitable retractable pin 214 is secured to the upper end of a spring mounted plunger 216 and projects through the cylindrical wall portion 186 to engage the fishing line in a conventional manner so that it will be wound on the spool 122 when the cup-shaped winding element 184 is rotated relative thereto by the handle 104.

The right end of the shaft 190 terminates in a cylindrical portion 218 and has a cam follower 220 with a bushing portion 222 projecting therefrom slidably mounted thereon. A washer 224 is secured to the right end of the cylindrical portion 218 of the shaft 190 and a suitable coil spring 226 is disposed over the cylindrical portion between the washer 224 and an internal shoulder 228 of the cam follower 220 to normally bias it to the left to the position illustrated in FIG. 8 wherein the left end of the bushing portion 222 abuts against the right end of the squared portion 204 of the shaft 190.

As most clearly illustrated in FIGS. 8 and 11, an eccentric pin 230 projects from the face of the gear 212 between flanges 232 and 234 of the cam follower 220 so that when the gear 212 is rotated by the handle 104, the eccentric pin will reciprocate the cam follower 220 which, in turn, reciprocates the shaft 190 to reciprocate the cup-shaped winding element 184 fixed to the left end of the shaft 190. To accomplish this, the spring 226 must be strong enough to resist sliding movement of the cam follower 220 relative to the cylindrical portion 218 of the shaft 190 when the shaft 190 is being retracted or moved to the right by the eccentric pin 230. As illustrated in FIG. 8, cup-shaped winding element 184, shaft 190 and level wind mechanism 182 are all illustrated in their retracted positions wherein the eccentric pin 230 is in its extreme right hand position. Of course, when the handle 104 and gear 212 are rotated through 180°, the eccentric pin will be in its extreme left hand position which will advance the shaft 190 and cup-shaped element 184 to the left a distance equal to twice the distance between the center of the eccentric pin and the center of the gear. This advanced position of the winding element 184 is illustrated in phantom and indicated by the numeral 237. Of course, the spring mounted plunger 216 is spaced inwardly of the left end of the bushing 114 a sufficient distance to make certain that it will not slip off the end of the bushing when the winding element is reciprocated to its advanced position. This advanced position of the plunger is also shown in phantom in FIG. 8 and indicated by the numeral 239.

The manner in which the spring mounted plunger 216 is mounted is more clearly illustrated in FIG. 13 wherein it will be observed that the plunger is provided with a reduced lower end portion 240 having laterally projecting flanges 242 thereon which enable the plunger 216 to be slidably mounted on the cup-shaped winding element 184 by two members 244 which are secured to the winding element by a plurality of screws 246, or the like, and overlap the flanges 242 in a manner to guide the sliding movement of the lower end portion 240. A suitable spring 248 is secured to the winding element 184 having an arm 250 thereof extending over the upper end of the plunger 216 in a manner to resiliently bias it downwardly into engagement with the bushing 114. When the plunger 216 slips off the end of the bushing 114, as will be described, the spring 248 urges it downwardly until shoulders 252 thereof engage the members 244 to limit the downward movement, at which point the lower end portion 240 would be in the position illustrated in phantom and indicated by the numeral 253. When in this lowered position the bottom edge of the plunger lies just above a point 271 on an eccentric cam surface 272 on the left end of the bushing 114 as will be described in greater detail hereinafter.

In operation rotation of the handle 104 will rotate and reciprocate the shaft 190, by virtue of the shaft being slidably keyed to the gear 206 by the squared portion 204 thereof, to rotate and reciprocate the winding element 184 relative to the spool 122 to wind the fishing line 23 thereon in an evenly distributed manner. When a cast is to be made, the pin 214 must be retracted to enable the fishing line to freely unwind. To accomplish this the push button 112 which has a web portion 260 thereof slidably projecting through a slot 262 in the body 102 and pivotally connected to the body by a pin 264, is pivoted in a clockwise direction as viewed in FIG. 8 to advance the shaft 190 and winding element 184 a sufficient distance to enable the spring mounted plunger 216 to slip off the left end of the bushing 114 to the position illustrated in phantom in FIG. 13. It will be observed that the web 260 of the push button 112 has a strip of metal 266 fixed thereto in position to have the lower end thereof engage the right end of the cylindrical portion 218 of the shaft 190. A rigid pin 270 projects from the web 260 in position to reinforce the strip of metal 266.

When the shaft 190 is advanced by pressing downwardly on the push button 112 in the manner described to enable the spring mounted plunger 216 to slip off the end of the bushing 114, the pin 214 secured to the plunger 216 will retract downwardly a sufficient distance to enable the fishing line to freely unwind when a cast is made. The shaft 190 is able to advance in response to the pivotal movement of the push button 112, even though the small cam follower 220 is held by the eccentric pin 230 so that it cannot advance, by virtue of the spring 226 which merely compresses to permit the cylindrical portion 218 of the shaft 190 to slide relative to the spool 220. When the push button 112 is released, it is free to pivot out of engagement with the end of the cylindrical portion 218 but the shaft 190 will not completely retract since the spring mounted plunger 216 overlies the left end of the bushing 114 to limit the retraction of the shaft 190. However, as soon as the handle 104 is rotated the spring mounted plunger 216 will be cammed outwardly by the eccentric cam surface 272 on the left end of the bushing 114 until it is moved outwardly a sufficient distance to slip back over the bushing 114 in response to the spring bias exerted thereon by the spring 226 which is compressed whenever the spring mounted plunger 216 overlies the left end of the bushing 114.

Assuming that a cast has been made and the fisherman desires to immediately stop the fishing line from paying out, the push button 112 can again be depressed to advance the shaft 190 further to the left until the rubber piece 198 abuts against the reinforcing bead 200 to clamp the fishing line therebetween. Of course, upon release of the push button 112, the compression of the spring 226 will retract the shaft 190 until the spring mounted plunger 216 strikes the left end of the bushing 114. Thereafter rotation of the handle 104 will bring the cam surface 272 into play to cam the spring mounted plunger 216 up onto the surface of the bushing 114.

Referring to FIGS. 8 and 12, a suitable clicker mechanism is illustrated which is comprised of a resilient finger 274 fixed to the circular wall portion 110 by a suitable screw 276 or the like and projecting into teeth 278 formed on the right end of the bushing 116. Assuming that the spinning reel has a suitable anti-reverse mechanism which prevents rotation of the handle 104 in a reverse direction, when a fish exerts a sufficient force on the fishing line to cause the spool 122 to slip against the braking action provided by the brake pads 44 and 58, the gear teeth 278 on the right end of the bushing 116 will rotate past the resilient finger 274 to make a clicking noise to alert the fisherman.

While it will be apparent that the embodiments of the invention herein disclosed are well calculated to fulfill the objects of the invention, it will be appreciated that the invention is susceptible to modification, variation and change without departing from the proper scope or fair meaning of the subjoined claim.

What is claimed is:

A brake for a closed face spinning reel comprising a body, a spool rotatably mounted on said body and having axially spaced radially extending flanges, adjustable brake means on said body for frictionally engaging one side of one of said flanges with a varible pressure, and a bracket fixed to said body and frictionally engaging the other side of said one flange at a position substantially opposite the portion of the flange engaged by said brake means, said bracket having one end thereof overlapping said other side of said one flange and having a brake pad thereon frictionally engaging said other side, the other end of the bracket being hooked over and releasably locked to said body, and a cup-shaped cover enclosing said spool and secured to said body, said cup-shaped cover overlying said other end of said brake to prevent the disengagement thereof from said body.

References Cited in the file of this patent
UNITED STATES PATENTS

| | | |
|---|---|---|
| 2,180,321 | Kovalovsky et al. | Nov. 14, 1939 |
| 2,249,297 | Muffett | July 15, 1941 |
| 2,351,041 | Hawley | June 13, 1944 |
| 2,612,968 | Hood | Oct. 7, 1952 |
| 2,613,468 | Hand | Oct. 14, 1952 |
| 2,668,025 | Hull | Feb. 2, 1954 |
| 2,687,855 | Shakespeare et al. | Aug. 31, 1954 |
| 2,772,839 | Morton | Dec. 4, 1956 |
| 2,776,803 | Shakespeare et al. | Jan. 8, 1957 |
| 2,903,202 | Sarah | Sept. 8, 1959 |
| 2,910,252 | Joy | Oct. 27, 1959 |
| 2,918,227 | Mauborgne | Dec. 22, 1959 |
| 2,974,895 | Wood | Mar. 14, 1961 |